United States Patent [19]

McCartney, Jr.

[11] 4,271,586
[45] Jun. 9, 1981

[54] METHOD OF MAKING BATTERY PLATES

[75] Inventor: Charles P. McCartney, Jr., Yorktown, Ind.

[73] Assignee: General Motors Corporation, Detroit, Mich.

[21] Appl. No.: 69,894

[22] Filed: Aug. 27, 1979

[51] Int. Cl.³ ............................................. H01M 4/74
[52] U.S. Cl. ......................................... 29/623.5; 29/2; 429/241
[58] Field of Search .............................. 29/623.5, 2; 429/233–243, 211

[56] References Cited

U.S. PATENT DOCUMENTS

| 460,599 | 10/1891 | Rosenbaum | 429/241 |
| 1,752,963 | 4/1930 | Pettinelli | 429/241 |
| 3,310,438 | 3/1967 | Huffman et al. | 429/242 |
| 3,686,916 | 8/1972 | Smith et al. | 29/2 |
| 3,758,340 | 9/1973 | Adams | 141/1.1 |
| 3,853,626 | 12/1974 | Daniels, Jr. et al. | 29/623.1 |

Primary Examiner—Daniel C. Crane
Attorney, Agent, or Firm—Lawrence B. Plant

[57] ABSTRACT

Battery grid-making stock expanded laterally outwardly from an unexpanded strip at the center of the stock and having two unexpanded strips at the lateral edges of the stock is filled with battery reactant and cut along a serpentine path transverse the length of the stock such as to segment the stock into a plurality of two-plate sets having lugs carved out of the unexpanded strips and projecting in the longitudinal direction of the stock. Thusly made plates have their lugs projecting from the sides of the plates and in alignment with the top and bottom borders thereof.

4 Claims, 8 Drawing Figures

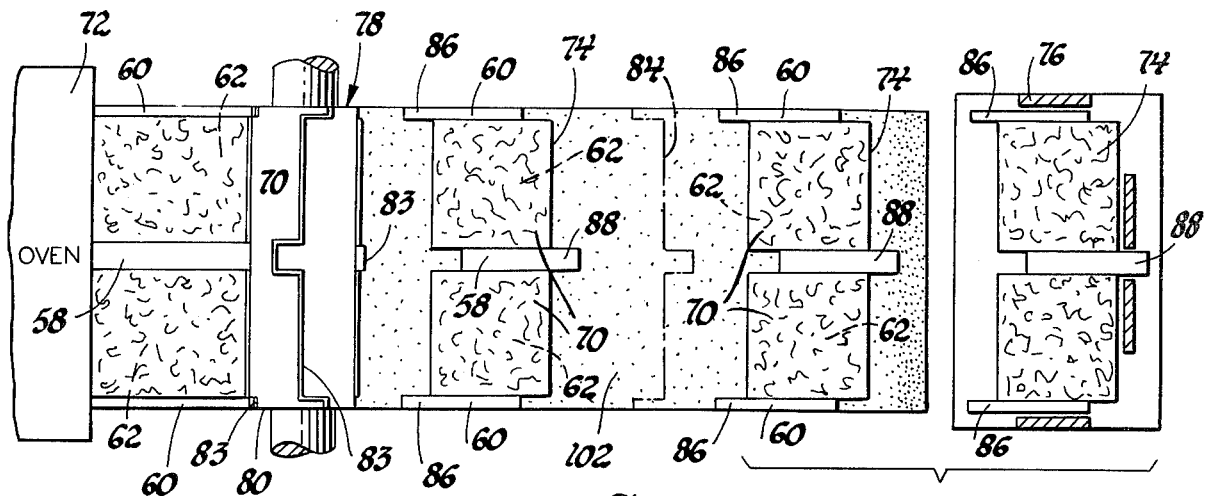
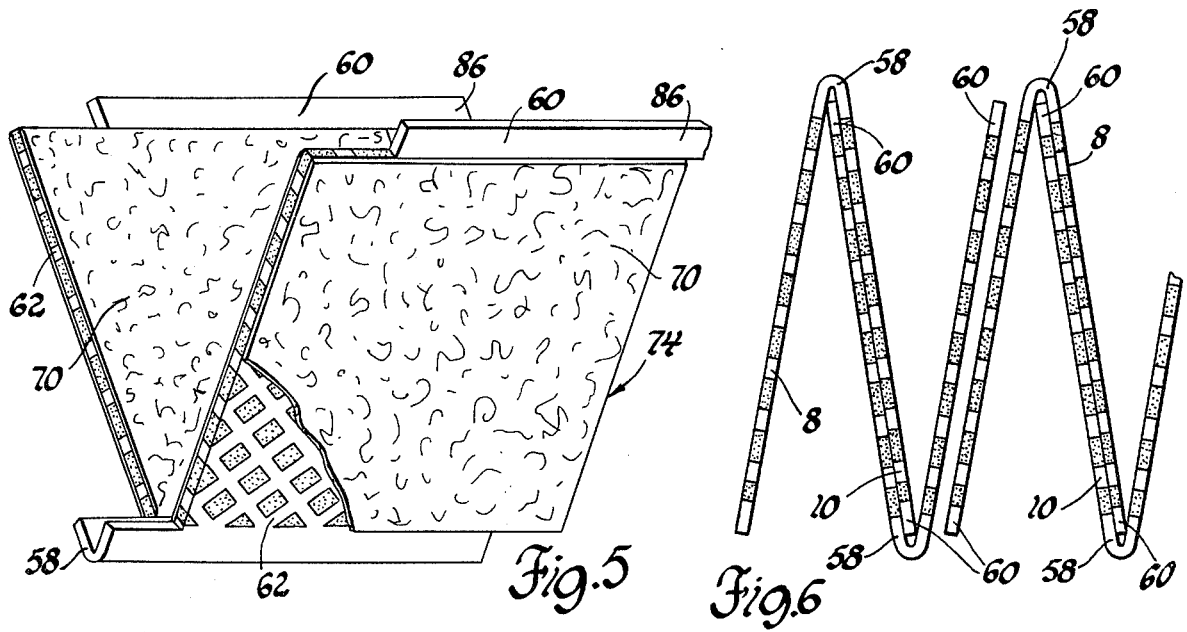
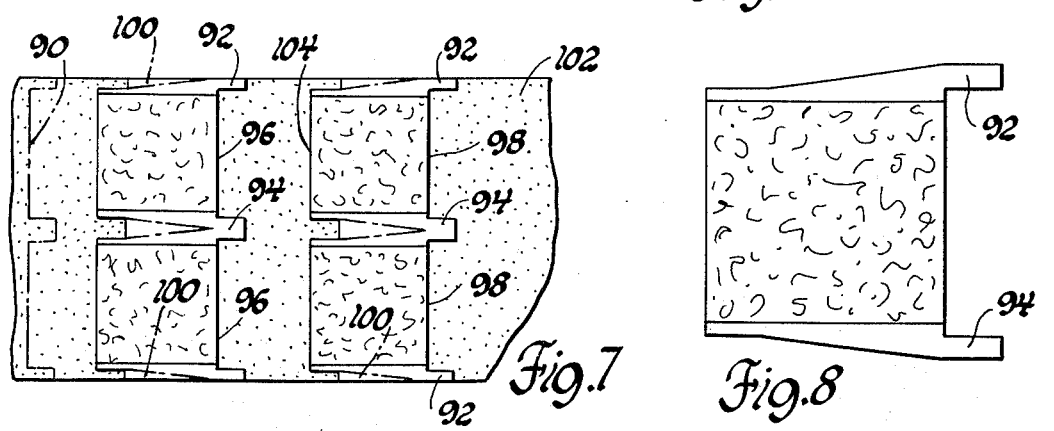

METHOD OF MAKING BATTERY PLATES

This invention relates to making electric storage battery plates from continuous lengths of expanded metal grid-making stock filled with battery reactant and the plates made therefrom. More specifically, this invention relates to cutting the plate-making stock transverse its length and such as to form plate lugs extending laterally of the plate from the top and bottom borders thereof.

U.S. patent Daniels et al U.S. Pat. No. 3,853,626 filed Sep. 20, 1973 and assigned to the assignee of the present invention discloses a continuous, in-line process for making bilateral lengths of lead-acid storage battery grid-making stock having an unexpanded strip at the center of the stock, two reticulated grid-wire networks expanded laterally from the unexpanded center strip and unexpanded edge strips defining the lateral edges of the stock. Ultimately, the center strip is used to form the current collecting top border and the edge strips the bottom border of battery plates made from the stock. The grid wire networks are subsequently filled with battery reactant (e.g., as by belt pasting or the process of Adams U.S. Pat. No. 3,758,340 filed Oct. 27, 1971 and assigned to the assignee of the present invention) and finally cut into individual battery plates. Heretofore, pasted battery grid-making stock (i.e., plate-making stock) so made has been punched and cut into individual battery plates by cutting the central unexpanded strip longitudinally such as to form one plate lug for each battery plate. The technique employed (i.e., see FIG. 2) generates offal or punchings that must be recycled and yields lugs which project from the top of each plate in a direction perpendicular to the longitudinal length of the strip and top border of the plate.

Some battery constructions have been proposed wherein each battery plate has lugs on both the top and bottom borders at corners of the plates (e.g., see FIG. 1). Such constructions tend to have lower internal resistance and are more vibration resistant. The aforesaid cutting technique is not capable of providing lugs on both the bottom and top borders at the corners of each plate.

It is an object of the present invention to cut continuous lengths of bilateral battery plate-making stock so as to provide plate lugs at the corners of, and on the top and bottom borders of, each battery plate cut therefrom. It is a further object of the present invention to so cut plates from such lengths with a minimum of waste or offal which must be returned to the melting pots for reuse. These and other objects and advantages of the present invention will become more readily apparent from the detailed description thereof which follows.

BRIEF DESCRIPTION OF THE INVENTION

The present invention relates to expanded metal battery plates having top and bottom borders and lugs extending laterally of the plates in alignment with the borders and to a method for making same comprising the steps of forming a length of battery grid-making stock having two grid wire networks expanded laterally outwardly from an unexpanded central strip. The central strip ultimately serves as a current collecting header or border in the finished plate. Two unexpanded strips are also provided at the outermost edges of the networks and define the lateral edges of the grid-making stock. These strips also serve as current-collecting headers or borders for their associated finished plates. Following expansion, the stock is filled (e.g., pasted) with battery plate reactant (e.g., PbO). Thereafter, the stock is cut into individual lug-bearing battery plates including a cut made along a serpentine path transverse the length of the stock such as to form two lugs for each plate. These lugs project in the longitudinal direction of the stock, are aligned with the border-forming unexpanded strips and are carved-out of the unexpanded strips of the next adjacent plate cut from the stock. The bilateral stock may be separated along the center of the center strip before cutting the individual plates, but is preferably first segmented into a plurality of two plate sets. The sets may then be folded and used as a set, or cut along the longitudinal center of the center strip to separate the set into discrete plates.

DETAILED DESCRIPTION OF THE INVENTION

The invention may best be understood from the following detailed description of certain embodiments thereof, which description is made in conjunction with the following figures in which:

FIG. 4 is an enlarged plan view of the plate cutting and stacking operations;

FIG. 5 is a perspective view illustrating a center folded plate set cut in accordance with the present invention;

FIG. 6 is a side elevational view illustrating a stacking arrangement of folded positive and negative plate sets;

FIG. 7 is a plan view of the post-cutting operation illustrating cutting according to a preferred embodiment of the present invention; and FIG. 8 is an enlarged plan view of a single plate having two lugs extending in the same direction from the top and bottom borders thereof after having been cut from the sets illustrated in FIG. 7 and trimmed for weight reduction.

Figure 1:
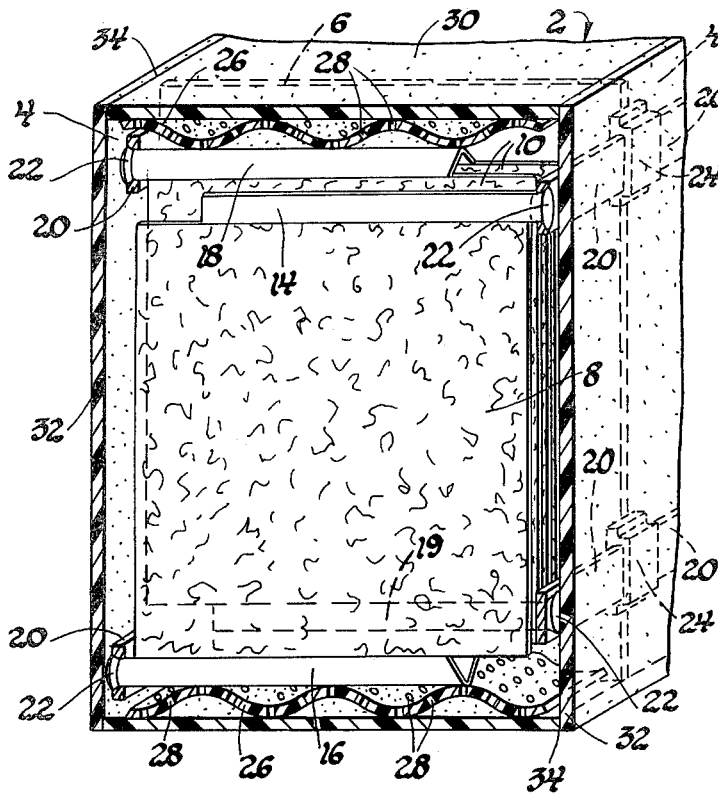
FIG. 1 is a sectioned, perspective view illustrating a battery having plates of the type which are the subject of the present invention.

FIG. 1 depicts a battery case 2 defining a number of cell compartments 4 separated by intercell partitions 6 (only one shown). As illustrated, the battery case 2 is formed from an open-ended rectangular channel 30 having side covers 32 heat sealed thereto along the weld line 34. Each compartment 4 houses a cell group comprising alternately spaced positive and negative plates separated one from the other by conventional microporous, ion permeable separators (not shown). In this illustration, positive plates 8 each have an upper border 14 and a lower border 16. The negative plates 10 have an upper center-folded border 18 and the lower border 19. The plate borders comprise conductive strips integral with the plate grids and serve as electrical headers for collecting and conducting current from the battery plates to plate lugs 22 which appropriately connect to straps 20. The positive plates 8 share a common center-folded lower border 16 while the negative plates 10 share a common center-folded upper border 18 and are stacked or integrated one with the other after the fashion illustrated in FIG. 6.

The several cell groups are electrically series joined together by any well known type of intercell connector 24 such that the positive plates of one cell are joined to the negative plates in the next adjacent cell. The plate straps 20 and the intercell connections 24 may be made either inside or outside the side covers 32 by any of the many techniques known in the art. The cell groups are held tightly in place in compartments 4 by corrugated plastic packing elements 26 which space the groups from the top and bottom of the case 2. The packing elements 26 have perforations 28 therein to permit free flow of electrolyte within the battery.

Figure 2:
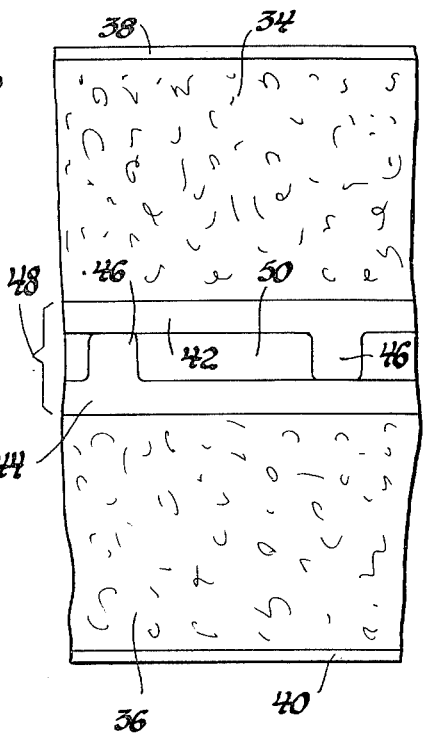
FIG. 2 is a plan view illustrating a section of pasted, expanded metal plate-making stock in which lugs have been cut from the center unexpanded strip according to prior art cutting practice.

FIG. 2 shows two battery plates 34 and 36 immediately after cutting from the bilateral plate-making stock according to the prior art cutting technique. The plates 34–36 have unexpanded bottom borders 38 and 40, respectively, and top border 42 and 44, respectively. Lugs 46 extend perpendicularly from the borders 42 and 44 and are cut from the unexpanded center strip of the strip 48. The portion 50 of the center strip 48 which lies between the lugs 46 is punched out and the punching (i.e., offal) returned to the melting pot for reuse. This technique for cutting battery plates from bilateral strips of expanded metal plate-making stock is limited to forming lugs on a single border and perpendicular thereto.

Figure 3:
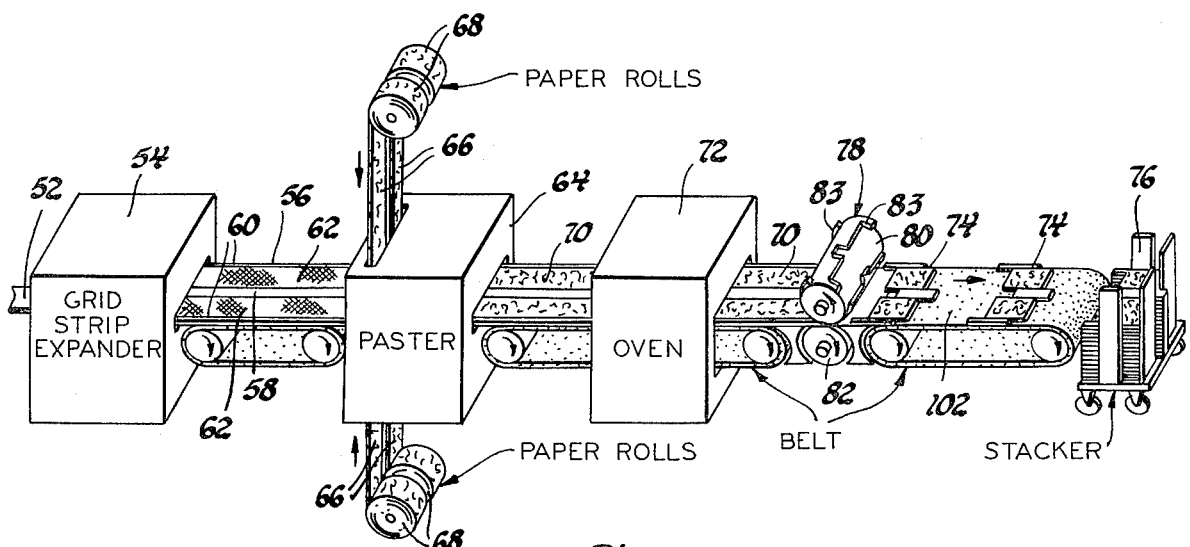
FIG. 3 is a perspective view illustrating the entire expanding, pasting, drying and cutting process for making battery plates according to one embodiment of the present invention.

FIG. 3 depicts a battery plate-making process in accordance with the present invention and will be described in conjunction with the making of Pb-acid plates. A ribbon 52 of lead is fed into an inline expander 54 such as described (e.g., see Daniels et al U.S. Pat. No. 3,853,626, supra) to produce a continuous bilateral length of grid-making stock 56. The stock 56 has a central unexpanded strip 58 and two unexpanded strips 60 at the lateral edges thereof. Between these unexpanded strips 58 and 60 is a network 62 of gridwires formed by the expander 54. The grid-making stock 56 enters an appropriate machine 64 (e.g., a belt paster) for filling the gridwire network 62 with battery reactant. The machine 64 sandwiches the grid-making stock and reactant between paper strips 66 fed from paper rolls 68 into the paster 64. Plate-forming stock 70 exits the paster 64 and passes into oven 72 for drying. Following drying, the plate-forming stock 70 is ready for cutting into individual battery plates or plate sets 74. A stacker 76 accumulates the plate sets 74 for subsequent processing, e.g., storage, curing, assembly, etc.

FIG. 4 is an enlarged plan view of the cutting and stacking operation that follows the drying oven 72 of the process depicted in FIG. 3. The plate-making stock 70 with its unexpanded center and lateral strips 58-60 and paper covered grid-wire networks 62 pass into an appropriate cutting means 78 for cutting the stock 70 transverse its longitudinal dimension or direction of movement. As illustrated, the cutter 78 includes a pair of coacting rollers 80-82 through which the plate-making stock 70 passes. The upper roller 80 has a plurality of blades 83 projecting radially outwardly therefrom and appropriately spaced about its circumference according to the desired width of the finished plates. The blade 83 presses the stock 70 firmly against the surface of the lower roller 82 so as to sever the stock 70 along a serpentine path illustrated by the dotted line 84. The stock 70 is thereby segmented into a plurality of sequentially spaced plate sets 74 each having plate lugs 86 and 88 carved out of the unexpanded border strips 58-60 of the next adjacent plate sets 74. In the particular embodiment shown in FIG. 4, the lugs 86 and 88 extend in opposite directions from the expanded gridwire networks 62 and are carved out of both the leading and trailing adjacent plate sets 74 on the belt. In the embodiment shown in FIG. 7, both plate lugs are formed on the same side of the plate and are carved out of only the trailing edge of the leading plate set as will be discussed in more detail in conjunction with the discussion of FIG. 7. While FIGS. 4 and 5 illustrate a process in which the stock 70 is cut into plate sets 74, it is to be understood that the stock 70 may be separated along the center line of the strip 58 before the serpentine cut is made so that each such cut produces a discrete lug-bearing plate rather than a set thereof.

FIG. 5 depicts a battery plate set 74 folded along the center line of the unexpanded strip 58 such that the paper clad expanded network 62 lay in substantially parallel planes and the unexpanded border strips 60 and their lugs 86 lie adjacent one another for joining to a common plate strap 20 (FIG 1). The thusly-folded plate sets 74 may then be integrated with similarly folded plate sets of opposite polarity in the manner shown in FIG. 6 (separators not shown). Numeral 8 indicates positive polarity plate sets and numeral 10 negative plate sets.

FIG. 7 is a plan view of a section of the belt 102 at the exit of the cutter 78 having plate sets 96–98 thereon cut according to another embodiment of the present invention. In this embodiment, the transverse cut is executed along a serpentine path 90 (shown in dotted lines on the figure) which is such as to form the edge lugs 92 and 94 on the same side of each plate set 96–98. As shown, the lugs 92–94 of plate set 96 are carved out of the trailing edge 104 of the next adjacent leading plate set 98. It is quite obvious, however, that the opposite would also be acceptable such that the lugs 92–94 could face rearwardly and be carved out of the top and bottom borders of the leading edge of the next adjacent trailing plate set. Triangular portions 100 (shown in dotted lines on FIG. 7) may later be trimmed away in a separate operation to eliminate any unnecessary metal, and hence, reduce the weight of plates thus produced. Only excess conductive border over that required to adequately carry the maximum current the plates will see is removed so that no untoward internal electrical resistance is imposed on the plate. Hence, the remaining borders will taper from a maximum at the end from which the lug extends to the opposite end thereof and at a rate generally commensurate with the current carrying needs of the border. Thereafter, each plate set 96–98 is separated along the center line of the center strip and through the lug 94 to produce two discrete plates. One such plate is shown in FIG. 8 after trimming off the excess metal 100 from the top and bottom borders. As before, the plate stock may be separated along the center line of the center strip either before or after making the serpentine cut.

While the invention has been disclosed primarily in terms of certain embodiments thereof, it is not intended to be limited thereto, but rather only to the extent set forth in the claims which follow.

The embodiments of the invention in which an exclusive property or privilege is claimed are defined as follows:

1. In the method of making battery plates comprising the principal steps of: (1) forming a length of battery grid-making stock, said stock comprising two grid-wire networks expanded laterally outwardly from an unexpanded strip at the longitudinal center of said length and two unexpanded strips at the outermost edges of said networks defining the lateral edges of said stock, said center and edge strips subsequently defining opposite borders of said plates; (2) filling said networks with battery plate reactant; and (3) cutting said filled stock into individual battery plates, the improvement comprising: severing said stock along spaced serpentine cuts transverse its length such as to segment said stock into a plurality of plates, said cuts forming at least two lugs on each plate projecting outboard said networks, the lugs for each plate being aligned with the borders and projecting from that plate's borders in the longitudinal direction of said stock and being carved out from the borders of the next adjacent plate severed from said stock.

2. In the method of making battery plates comprising the principal steps of: (1) forming a length of battery grid-making stock, said stock comprising two grid-wire networks expanded laterally outwardly from an unexpanded strip at the longitudinal center of said length and two unexpanded strips at the outermost edges of said networks defining the lateral edges of said stock; (2) filling said networks with battery plate reactant; and (3) cutting said filled stock into battery plates, the improvement comprising: severing said stock along spaced serpentine cuts transverse its length such as to segment said stock into a plurality of two-plate sets, said cuts forming a plurality of lugs on each set projecting outboard said networks, said lugs being aligned with and projecting from the center and edge strips of each plate set in the longitudinal direction of said stock and being carved out from the corresponding center and edge strips of the next adjacent plate set severed from said stock.

3. In the method of making battery plates comprising the principal steps of: (1) forming a length of battery grid-making stock, said stock comprising two grid-wire networks expanded laterally outwardly from an unexpanded strip at the longitudinal center of said length and two unexpanded strips at the outermost edges of said networks defining the lateral edges of said stock, said center and edge strips subsequently defining opposite borders of said plates: (2) filling said networks with battery plate reactant; and (3) cutting said filled stock into individual battery plates, the improvement comprising: severing said stock along spaced serpentine cuts transverse its length such as to segment said stock into a plurality of plates, said cuts forming at least two lugs on each of said plates projecting outboard said networks in opposite directions to each other, the lugs for each plate being aligned with the borders and projecting from the plate's borders in the longitudinal direction of said stock and being carved out from the borders of the next adjacent plate severed from said stock.

4. In the method of making battery plates comprising the principal steps of: (1) forming a length of battery grid-making stock, said stock comprising two grid-wire networks expanded laterally outwardly from an unexpanded strip at the longitudinal center of said length and two unexpanded strips at the outermost edges of said networks defining the lateral edges of said stock, said center and edge strips subsequently defining opposite borders of said plates; (2) filling said networks with battery plate reactant; and (3) cutting said filled stock into individual battery plates, the improvement comprising: severing said stock along spaced serpentine cuts transverse its length such as to segment said stock into a plurality of plates, said cuts forming at least two lugs on each of said plates projecting in the same direction outboard said networks, the lugs for each plate being aligned with the borders and projecting from that plate's borders in the longitudinal directon of said stock and being carved out from the borders of the next adjacent plate set severed from said stock.

* * * * *